June 20, 1972 S. W. SHELLEY 3,671,368
INSULATED REINFORCED BUILDING PANEL
Filed Dec. 24, 1970 2 Sheets-Sheet 1
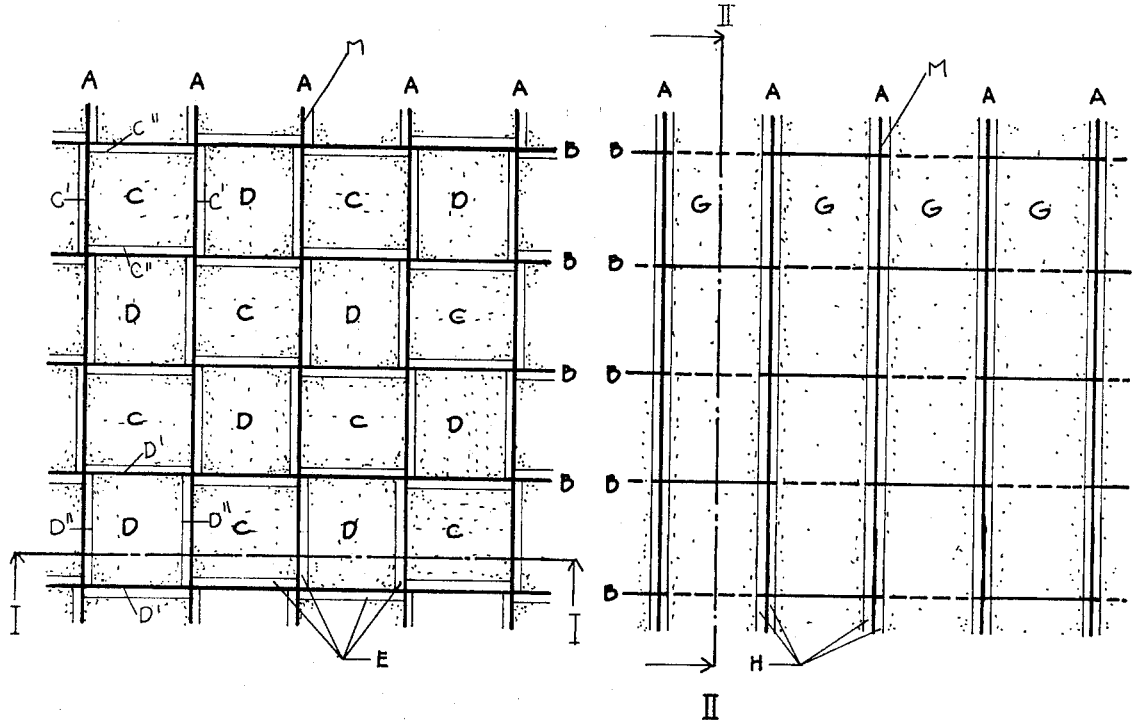
FIG-1 FIG-3
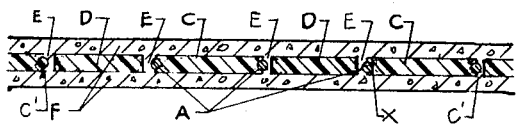 
FIG-2 FIG-4
INVENTOR.
SHELLEY W. SHELLEY

INVENTOR.

SHELLEY W. SHELLEY

United States Patent Office 3,671,368
Patented June 20, 1972

3,671,368
INSULATED REINFORCED BUILDING PANEL
Shelley W. Shelley, 53-B Pine Grove Condominium,
Isla Verde, Puerto Rico 00914
Filed Dec. 24, 1970, Ser. No. 101,213
Int. Cl. B32b; E04b
U.S. Cl. 161—38                16 Claims

ABSTRACT OF THE DISCLOSURE

Insulating material is inserted within the openings of a typical wire mesh concrete reinforcing mat so that the insulation is firmly retained therein and occupies a substantial portion of, but not the entire opening. The insulated reinforcing mat is disposed within a closed mold of a configuration suitable for preparing a panel, and concrete or other suitable moldable building material is poured by gravity into the mold while the mold is inclined at an angle which preferably is about 30 to 90 degrees with respect to the horizontal.

BACKGROUND OF THE INVENTION

This invention relates to the casting of reinforced insulated building panels. Such panels generally comprise a layer of any suitable insulating material sandwiched between two external layers of reinforced concrete or other suitable moldable building material.

In one previous method for preparing such panels, the insulating layer is placed between two layers of a moldable building material such as concrete, with two concrete reinforcement mats positioned on each side of the insulating layer between the insulating layer and the concrete layers. The two concrete layers are bound together by a plurality of connecting rods positioned perpendicularly to the reinforcement mat which pass through the insulating layer and protrude into each concrete layer. One disadvantage of this method is the expense of providing and installing the dual reinforcement mats and the perpendicular connecting rods.

Such panels are typically prepared using horizontal molds because of difficulties encountered when vertical molds are used. Concrete is poured into the mold to form the first layer of concrete after which the reinforcement mats, insulating layers, and connecting rods are installed. The second layer of concrete is then poured. Since open horizontal molds are used, the outer surface of the second concrete layer possesses a rough texture and, ordinarily, must be finished to a smooth surface by hand or machine. This finishing operation is most undesirable because of the cost involved.

It is, therefore, an object of this invention to provide an insulated reinforced building panel which eliminates the need for dual reinforcement mats and the perpendicular connecting rods by providing a panel wherein a single reinforcement mat serves the simultaneous purposes of reinforcing the moldable building material, providing connection between the two external layers of moldable building material, and serving as a receptacle for the insulating layer of the panel.

It is another object of this invention to provide a method whereby the need for finishing the surface of the panel to a smooth finish is eliminated by the expedient of casting the panel in a closed mold disposed at an angle greater than zero degrees above the horizontal.

These and other objects of this invention will be apparent to one skilled in the art from a consideration of this entire disclosure.

SUMMARY OF THE INVENTION

In accordance with this invention, the above objectives are achieved by inserting into the openings of a single concrete reinforcement mat having a generally open wire mesh configuration, an insulating material in such a manner that the insulating material occupies a substantial portion, but not all, of the opening, this unoccupied portion, of the opening hereinafter referred to as the "free space" of the opening. The insulating material is restrained within the opening so that it will not become dislodged when the mat is moved or placed in an upright or inclined position.

The mat containing the insulating material is disposed within a closed mold which is suitable for gravity pouring or pumping of concrete or other suitable moldable building material into the mold when the mold is disposed at an angle greater than zero degrees above the horizontal position. The mold has a configuration conforming to that desired for the panel. The mat is disposed at the desired position within the mold by the use of chairs, spacing devices or other known techniques. The insulating material can be emplaced within the openings of the open mesh reinforcement mat either prior to or after the mat is disposed within the mold.

Concrete is next placed into the mold while the mold is disposed at an angle which is greater than zero degrees, and typically either about 90, or 30 to 60 degrees, above the horizontal. This angle is measured from the plane of the panel defined by the mold. As the concrete enters the mold, the free space of the openings of the reinforcement mat, which are not occupied by insulating material, provide channels of communication between the concrete flowing downwardly into the mold on opposite sides of the mat, thereby allowing the concrete on each side to seek a common level within the mold. This is desirable because it minimizes the damage which could result to the mat as a result of the pressure differential created within the mold in the case where one side of the mold fills with concrete more rapidly than the other.

Moreover, by providing communication between both external concrete layers, the free spaces of the openings also enable the formation of a multiplicity of bonding contacts between the two layers when the concrete which occupies these free spaces hardens.

An additional feature of the free spaces within the openings of the reinforcement mat is that they provide access for the concrete to the wires or rods which comprise the mat, so that the mat is firmly attached to each layer of concrete when the concrete hardens. This results because at least a portion of the wires or rods defining the free space have their entire periphery exposed to the concrete and, become firmly embedded within the concrete at the interface of the two concrete layers.

Since the panel is prepared in closed molds, disposed at an angle greater than zero degrees above the horizontal position, both external surfaces of the panel exhibit a smooth finish which eliminates the need for additional finishing operations.

The reinforcement mat can take a variety of forms. For example, it can be a sheet of welded wire mesh or a matrix of metallic rods such as, for example, steel rods.

The insulating material inserted into the openings of the mat can similarly take a variety of forms. For example, it can be a panel which is snugly insertable into the openings of the mat, or it can take the form of one or more continuous strips which are woven through the mesh of the reinforcement mat.

Any suitable insulating material such as, for example, polyurethane and polystyrene foams can be employed.

If effective insulating properties are to be imparted to the panel, it is apparent that the portions of the openings of the wire which are not occupied by insulating material cannot be excessively large. The percentage of the openings which can remain unoccupied will vary depending on a number of factors such as, for example, the nature and thickness of the concrete material. In general, the insulating material should occupy at least 65%, and preferably 65 to 95% of the area of the openings of the reinforcement mat.

The resulting panel is insulated, reinforced by a single mat, and has smooth external surfaces which require no additional finishing as a result of pouring the moldable building material into an inclined mold. Moreover, the two outer layers of building material, between which the insulated reinforcement is sandwiched, are bonded together and to the reinforcement mat by means of the building material within the unoccupied portions of the mesh openings.

The invention will become more fully apparent from the following description of certain preferred embodiments, when read with reference to the accompanying drawings.

BRIEF DESCRIPTION OF THE DRAWINGS

FIG. 1 is a schematic plan view of a concrete reinforcement mat of a wire mesh configuration with each mesh opening having disposed therein an insulating panel.

FIG. 2 is a sectional view taken generally along the line I—I of FIG. 1 and further including two external layers of concrete between which the insulated reinforcement mat of FIG. 1 is sandwiched.

FIG. 3 is a schematic plan view of a concrete reinforcement mat of wire mesh configuration through which is woven a plurality of continuous strips of insulating material.

FIG. 4 is a sectional view taken generally along the line II—II of FIG. 3 and further including two external layers of concrete between which the insulated reinforcement mat of FIG. 1 is sandwiched.

DESCRIPTION OF CERTAIN PREFERRED EMBODIMENTS

Referring to FIGS. 1 and 3, it is seen that a reinforcement mat M of wire mesh configuration is depicted, this mat being composed of a plurality of steel rods A running perpendicular to a plurality of steel rods B to define an open wire mesh configuration containing a plurality of substantially square shaped openings. Into each of these openings is inserted an insulating panel C, D of a generally rectangular configuration. It is seen that the area of each panel C, D is somewhat less than that of the opening into which it is inserted, with the result that while panels C, D do occupy a substantial portion of the area of the opening, there is left a small amount of free space E which is unoccupied by panels C, D.

Panels C, D are preferably dimensioned so that one set of opposed edges C′ D′ contacts either rods A or B while the other set of opposed edges C″ D″ falls short of contact with rods A or B to provide unoccupied free space E at one set of opposed panel edges. It is likewise preferred that panels C, D be emplaced in such manner that each panel contacts a rod A, B of the reinforcement mat which is perpendicular to that contacted by its immediately adjacent panel. The effect of this is to provide a zone of free space E about the entire periphery of each insulating panel.

It is important that panels C, D be firmly retained with the openings of the reinforcement mat. This is accomplished by providing a groove X (see FIG. 2) in each edge C′ D′ of panels C, D which contacts rod A or B. This groove is adapted to receive rods A or B once panels C, D are snapped into the openings of the mat. Grooves X function to retain panels C, D within the openings of the mat. As can be seen in FIG. 2, the dimension of the panel between the two grooved edges C′ slightly exceeds the dimension of the mesh opening into which it must be inserted. However, the exertion of a slight pressure forces the panel into the mesh opening and locks it in place once rods A or B seat in groove X.

In another embodiment (see FIGS. 3 and 4) panels C, D are replaced by a plurality of continuous strips G of insulating material which is sufficiently flexible to be woven through the mesh of the reinforcement mat. As shown, each strip G is substantially parallel to each adjoining strip and, alternatively, goes over and under rods B (see FIG. 4). The width of strip G is dimensioned so that it will occupy a substantial portion, but not all, of the openings of the reinforcement mat. The result is that a free space H is provided within each opening. Strip G is preferably woven so that free space H is provided on each side of the strip.

Figure 5:
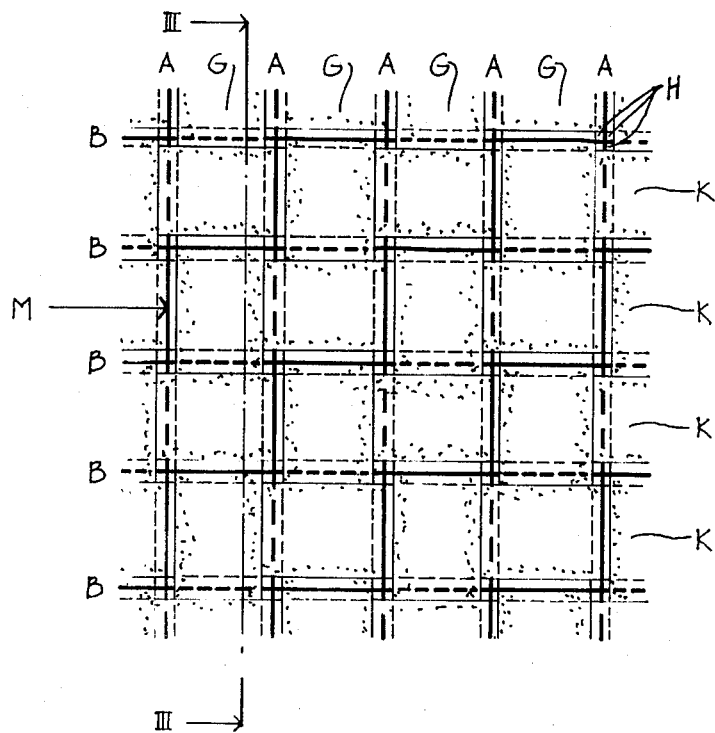
FIG. 5 is a schematic plan view of a concrete reinforcement mat of wire mesh configuration through which is woven a first and a second set of continuous strips of insulating material, the second set of strips being woven throughout the mat in a direction perpendicular to that of the first set of strips.
Figure 6:
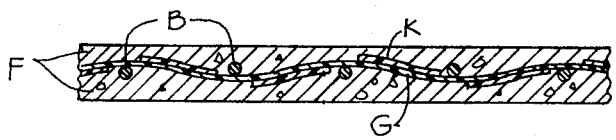
FIG. 6 is a sectional view taken generally along the line III—III of FIG. 5 and further including two external layers of concrete between which the insulated reinforcement mats of FIG. 5 are sandwiched.

Although strips G are woven in a single direction in FIG. 3, a second set of strips K can be woven throughout the mat in a direction perpendicular to that of strips G and in a manner substantially identical to strips G. This technique provides a dual layer of insulating material within the panel as illustratively shown in FIGS. 5 and 6.

Once the insulated reinforcement mats, such as those shown in FIGS. 1 and 3, are prepared as described hereinabove, the insulating mat is inserted into a mold of the desired panel configuration. The mold is a closed mold of the type suitable for placing concrete into the mold by gravity or pumping when it is disposed at an angle greater than zero degrees above the horizontal. The insulated mat is disposed at the desired location between the internal faces of the mold by the use of chairs or other suitable spacing devices known to those skilled in the art. In another embodiment, the insulating material is emplaced within the openings of the mat after the mat is disposed within the mold.

After the insulated mat is properly disposed within the mold, the closed mold is elevated to an angle which is greater than zero and typically either 90 or about 30 to 60 degrees with respect to the horizontal. Preferred angles are either about 45 degrees or 90 degrees. The angle is measured from the plane of the panel defined by the mold. The concrete is then introduced into the elevated mold at or near its top portion and fills the mold.

Since the insulated reinforcement mat is typically disposed substantially centrally between the inner faces of the mold, two channels are available for the flow of concrete within the mold, one on each side of the insulated mat. If one channel tends to fill more rapidly than the other, the free space in the openings of the mat permits the concrete from the more rapidly filling channel to spill over into the other channel thereby creating a substantial equilibration of concrete levels within each channel. This is advantageous because it minimizes the buildup of undesirable pressure differentials between the two concrete flow channels.

As the concrete fills up the unoccupied free space of the numerous openings of the reinforcement mat, numerous points of bonding contact are provided between the two external concrete layers when the concrete in these free spaces hardens. The insulated mat is then rigidly sandwiched between the two firmly bonded layers of concrete.

The free space of each opening of the reinforcement mat also provides for access of the concrete to the mat itself. At least a portion of the rods A, B which define the free space of the openings of the mat have their entire periphery accessible to the concrete so that the concrete can completely surround and imbed therein these portions of rods A, B. This provides for firm bonding, at numerous points throughout the panel, of the reinforcement mat to each of the concrete layers. In the embodiment shown in FIG. 3, virtually the entire portion of rods A, B which define the free space H will be embedded in the concrete. In the embodiment of FIG. 1, only a portion of rods A, B which define free space E will be completely embedded in the hardened concrete although the mat is still rigidly bonded to the concrete layers.

After the concrete has hardened, the panels are removed from the mold. FIGS. 2 and 4 depict cross-sectional views of two embodiments of these panels wherein it can be seen that the insulated reinforcement mats are now sandwiched between two external layers F of concrete. The concrete in free spaces E and H bonds the two external concrete panels together.

The panels shown in FIGS. 2 and 4 are insulated by panels C, D or strips G and the concrete is reinforced by rods A, B. Moreover, only a single reinforcement mat is employed and there is no need for providing connecting rods running perpendicular to the mat to connect the two external layers F of concrete since these layers are connected by the concrete lodged in free spaces E and H. Since the panel was formed in an elevated angularly disposed closed mold, the outer surfaces of the panel will be smooth thus not requiring costly finishing by hand or machine to produce the desired smooth finish.

The specific embodiments shown in the attached drawing and described hereinabove are illustrative only and such modifications and alterations as would be apparent to one skilled in the art are contemplated to fall within the spirit and scope of the claims appended hereto.

What is claimed is:

1. A reinforced insulated moldable building material panel comprising:
   (1) two external layers of moldable building material;
   (2) a reinforcement mat of an open wire mesh configuration disposed between said two external layers;
   (3) an insulating material disposed within the openings of said reinforcement mat, said insulating material being maintained in fixed relationship with said mat and occupying a substantial portion of said openings, said openings containing a free space which is free from occupation by insulating material; and
   (4) additional moldable building material disposed in said free space to provide bonding contact between the two layers and between each layer and said mat.

2. The panel of claim 1 wherein said moldable building material is concrete.

3. The panel of claim 1 wherein said mat comprises an open mesh formed by a plurality of substantially perpendicular metal rods.

4. The panel of claim 1 wherein said mat comprises a sheet of welded wire mesh.

5. The panel of claim 1 wherein said insulating material occupies from about 65 to 95% of the area of said openings.

6. The panel of claim 5 wherein said mat comprises an open mesh formed by a plurality of substantially perpendicular metal rods and wherein said moldable building material is concrete.

7. A reinforced insulated concrete building panel comprising:
   (1) two external layers of concrete;
   (2) a concrete reinforcement mat of an open wire mesh configuration disposed between said two external layers of concrete; and
   (3) a plurality of insulating panels disposed within the openings of said reinforcement mat, said panels being maintained in fixed relation with said mat and occupying a substantial portion of said openings, said openings containing a free space which is free from occupation by insulating material; and
   (4) additional concrete disposed in said free space to provide bonding contact between the two layers and between each layer and said mat.

8. The panel of claim 7 wherein said panels are disposed within said openings so as to provide unoccupied free space adjacent to a first set of opposed edges of the panel.

9. The panel of claim 8 wherein a second set of opposed edges of the panel contain a groove adapted to engage the strands of the mat so as to thereby affix the panel to mat.

10. The panel of claim 9 wherein said grooves of each panel engage strands of said mat which are substantially perpendicular to the strands engaged by the grooves of each adjoining panel.

11. The panel of claim 10 wherein said mat comprises an open mesh formed by a plurality of substantially perpendicular metal rods.

12. The panel of claim 7 wherein said insulating panels occupy from about 65 to 95% of the area of said openings.

13. A reinforced insulated concrete building panel comprising:
   (1) two external layers of concrete;
   (2) a concrete reinforcement mat of an open wire mesh configuration disposed between said two external layers of concrete; and
   (3) a plurality of continuous strips of insulating material, each of which is woven, in the same direction, through the mesh openings of said mat, said strips occupying a substantial portion of said openings, said openings containing a free space which is free from occupation by insulating material; and
   (4) additional concrete disposed in said free space to provide bonding contact between the two layers and between each layer and said mat.

14. The panel of claim 13 wherein said insulating panels occupy from about 65 to 95% of the area of said openings.

15. The panel of claim 13 wherein said strips of insulating material are disposed within said openings so as to provide unoccupied free space on opposed sides of the strip.

16. The panel of claim 15 further including a plurality of continuous strips, each of which is woven in the same direction, said direction being substantially perpendicular to that of the strips defined in section (3) of claim 13, said strips occupying a substantial portion of each of said openings, said opening containing a free space which is free from occupation by insulating material.

References Cited
UNITED STATES PATENTS

| | | | |
|---|---|---|---|
| 1,944,079 | 1/1934 | Graves | 52—405 X |
| 2,007,148 | 7/1935 | White et al. | 52—405 |
| 3,435,580 | 4/1969 | Merrill et al. | 52—405 |

PHILIP DIER, Primary Examiner

U.S. Cl. X.R.

52—405, 438; 161—40, 115